Dec. 3, 1968    J. R. MOORE ET AL    3,414,136

UNDERWATER MANIPULATOR SYSTEM

Filed Jan. 18, 1966    2 Sheets-Sheet 1

INVENTORS
JOHN R. MOORE
JAMES S. SWEENEY

BY *Robert G. Rogen*

ATTORNEY

INVENTORS
JOHN R. MOORE
JAMES S. SWEENEY
BY
*Robert G. Roger*
ATTORNEY

United States Patent Office 3,414,136
Patented Dec. 3, 1968

3,414,136
UNDERWATER MANIPULATOR SYSTEM
John R. Moore, Los Angeles, and James S. Sweeney, Laguna Beach, Calif., assignors to North American Rockwell Corporation, a corporation of Delaware
Filed Jan. 18, 1966, Ser. No. 521,323
8 Claims. (Cl. 214—1)

ABSTRACT OF THE DISCLOSURE

System for positioning an underwater manipulator arm to correspond with the position of an analog arm. The flow rate and pressure of the fluid transmitted to the hydraulic actuators used to move the manipulator arm are measured by transducers. The output of the transducers is integrated or otherwise processed by conversion circuits to produce a signal, indicative of the position of the manipulator, which signal is compared with another signal indicative of the analog arm position. An error signal thereby is produced which appropriately actuates valves controlling the fluid flow to the hydraulic actuators, thereby causing the manipulator arm to move to the desired position. Rate damping is provided to the analog arm to simulate the viscous damping experienced by the manipulator during motion in the viscous underwater medium.

---

This invention relates to an underwater manipulator system and more particularly to a system for controlling an underwater manipulator with an analog manipulator.

Conventional designs of underwater manipulator systems utilize bidirectional drive systems and binary control systems for the elements in the system. Visual observation is often relied on for position sensing. In more sophisticated control systems, optimal design utilizes controlled element position sensing. The position detector produces a signal proportional to the position of the device. From the detector signal and a reference signal, an error signal is produced to drive the controlled element. The lack of direct position sensing precludes precise control.

Control systems operated by simple binary switching to control position, velocity, etc. of a device tend to be difficult to operate for accurate positioning.

Performance of a control loop composed of a simple drive system, large controlled element mass, lack of position sensing and transmission delay due to human reaction time is characterized by uncoordinated sequential manipulator movements, long action times and low precision.

Precision feedback by direct transducer sensing of the elements of the underwater manipulator is difficult since the high pressure, corrosive undersea environment multiplies the problems of sealing the transducer and signal leads. Therefore, it is desirable to monitor the characteristics of the energy which actuates the elements of a manipulator.

The system of the present invention provides an improved control system which overcomes the deficiencies indicate dabove by measuring the characteristics of the actuating fluid, such as pressure and/or flow rate, to each manipulator element.

Briefly, the system comprises an analog arm of movable elements which may be positioned manually and an underwater manipulator of movable elements which is driven in accordance with signals generated by the analog arm to assume the same position. For example, if an element of the analog arm is positioned at a 45° angle with respect to a reference, the underwater arm element would be driven in synchronism to assume a 45° angle with respect to the reference. More specifically, the system utilizes a drive means which is responsive to the motion of an element of the analog arm and which provides a signal for driving an element of the underwater manipulator. Each element of the underwater manipulator includes a hydraulic position actuator which is driven by a fluid. Sensing means detects a corollary of the motion of each element of the underwater manipulator and generates a signal indicative of that motion. By knowing the initial position of the manipulator and the amount of motion, a new position can be determined if desired. The signal is generated by monitoring hydraulic fluid pressure and/or flow rate to a particular element being actuated. Each signal is compared by the drive means with a signal indicating the motion of an element of the analog arm. If they are different, an error signal is generated to drive the underwater arm until the amount of motion and therefore the signals are equal.

Each element of the analog arm includes sensing means and means for providing damping to approximate the natural damping of the underwater manipulator. Other features of the analog manipulator and arm are substantially the same except for size.

Although the analog arm may be positioned manually, in one embodiment, a computer monitored and controlled servo system is used. The terms arm and manipulator are interchangeable, although for clarity the analog portion is referred to as the arm and the external portion is referred to as a manipulator.

Therefore, it is an object of this invention to provide an underwater manipulator system having an improved positioning system.

It is another object of this invention to provide a system using an observable analog device as a position reference for an underwater manipulator.

Another object of this invention is to provide a system reducing the visible detection required for the positioning of an underwater manipulator.

A still further object of this invention is to eliminate direct transducer sensing of the movablce elements of an underwater manipulator and to monitor the actuating hydraulic fluid characteristics for an indication of manipulator position.

A still further object of the invention is to provide rapid, accurate and coordinated manipulator control by measuring fluid pressure and/or flow rate to a manipulator element.

These and other objects of this invention will become apparent in connection with the following figures of which:

Figure 1:
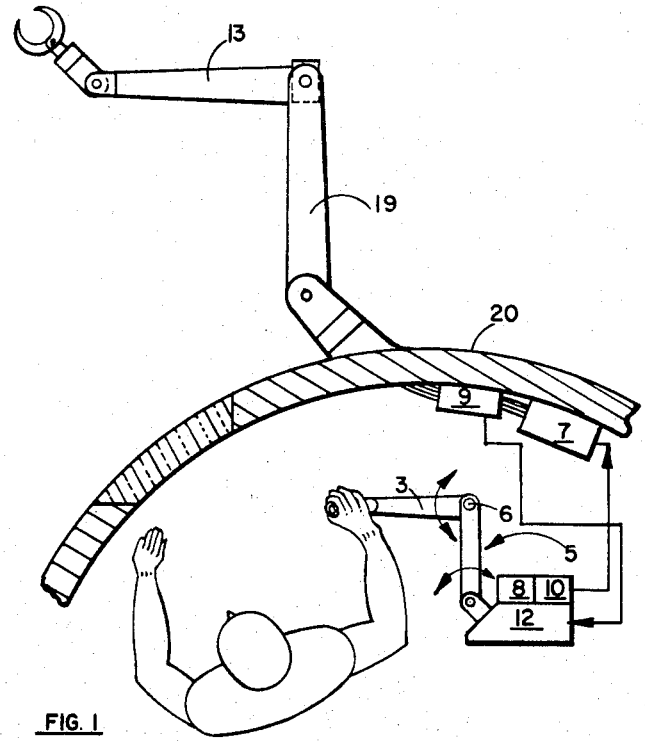
FIG. 1 represents a block diagram illustration of the system.

Referring now to FIG. 1, one embodiment of a system for controlling one section of an underwater manipulator is shown. The system must be duplicated for each section of a manipulator which must be controlled. For purposes of this description, only one such system will be described in detail.

The system for controlling a manipulator section illustrated may be categorized into elements or components operative with the analog arm 5 comprising motion sensing means 4, (FIG. 1a), analog damping means 6, (FIG. 1a), error signal generator 8 and switch means 10. The elements or components operative with manipulator 19 are comprised of hydraulic valve means 7, flow and pressure transducers 9, hydraulic actuator means 11, (FIG. 1b) and conversion circuits means 12. The manipulator elements or components generally become operative in response to impulses from the analog arm element or component.

Movement of section 3 of analog arm 5 rotates a shaft or other means, which mechanically links and rotates sensing means 4. This rotation produces a change in potential or current, representing a change in arm position. The change in potential is processed in the bi-directional relay means 8, providing a signal to the switch-activated hydraulic valve 7. This, in turn, initiates fluid flow through the flow transducer means 9, hydraulic lines 1, 2, 1a, and 2a and finally to pistons in hydraulic actuator 11. Piston actuation causes a movement of section 13 of manipulator arm 19. This rotation duplicates the original movement of section 3.

Figure 2:
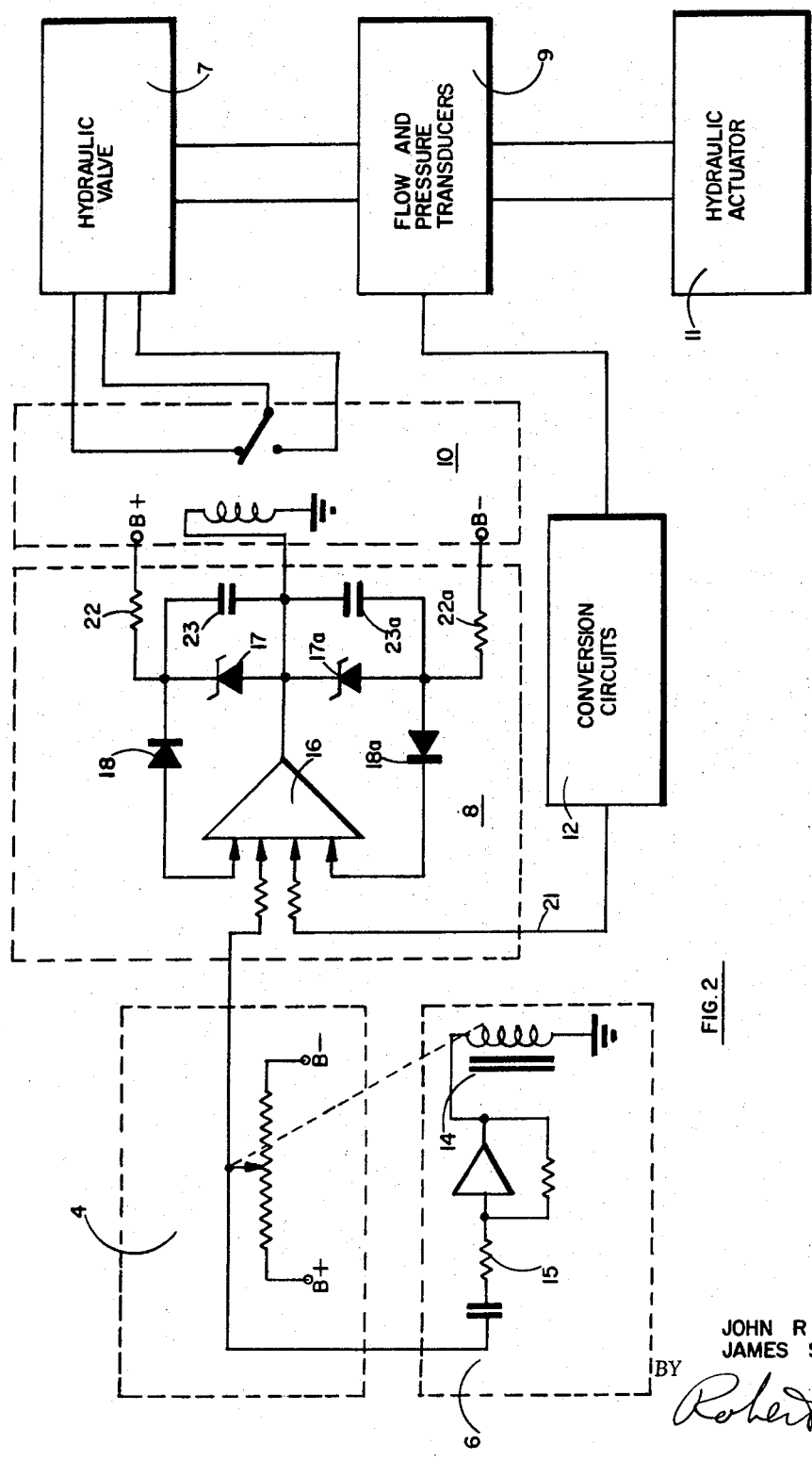
FIG. 2 represents an embodiment of components usable in the system.

Referring now to FIG. 2, an analog element sensing means 4 is shown, which may be a potentiometer (as shown) or other means such as synchro-control transformer, variable capacitor, photocell arrangement, or other device designed for sensing mechanical motion. It should be observed that many manipulator embodiments could be used in lieu of or in addition to the embodiment shown.

As shown in FIG. 2, analog element damping means 6 includes torque motor 14 and differentiator circuit means 15. The differentiator provides a measure of arm velocity. The combination of differentiator 15 and motor 14 could be replaced by other damping means such as a servo unit and mechanical viscous damping means utilizing a valve constriction to oil flow into a container.

Error signal generator 8 is shown in FIG. 2 as high gain amplifier 16 having essentially infinite gain such that for an unbalanced input, the output would be driven to the amplifier limit. A regulated supply comprised of resistors 22 and 22a, capacitors 23 and 23a, and Zener diodes 17 and 17a provide a reference to limit the amplifier output below saturation with feedback through diodes 18 and 18a to prevent stage overload from occurring. The limit value must have a magnitude sufficient to drive switching means 10. The amplifier may be represented by other high gain units such as a servo amplifier, magnetic amplifier, etc.

Switching means 10 is shown as a sensitive bi-polar 3-pole relay capable of being driven in either direction by a voltage of the corresponding polarity. The relay contacts of means 10 are used to actuate the hydraulic valve 7 for the manipulator element. In one position, the manipulator element is hydraulically driven in one direction and when in the other position, the element is driven in the opposite direction. When the relay is not energized, the manipulator element is motionless. Switching means 10 may also be logic means having three states, silicon switches, controlled rectifier logic, thyratron, or similar devices.

Figure 1B:
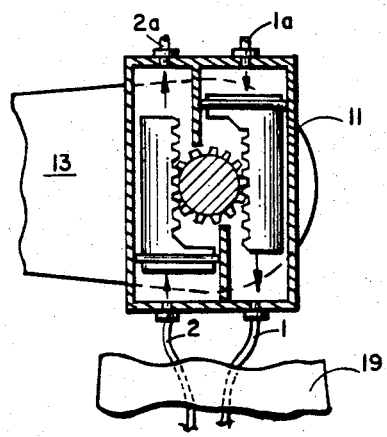
FIG. 1b is a sectional view of an element of the underwater manipulator arm including actuating means.
Figure 1A:
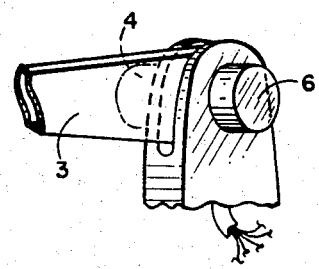
FIG. 1a is a representation of an element of the analog arm including sensing and damping means.

The hydraulic actuator means 11 installed inside manipulator 19 is shown in FIG. 1b and includes actuator tubing 1, 2, 1a and 2a. Other component parts well-known and obvious to persons skilled in the art, such as the gearing and hydraulic cylinders, are also shown.

Underwater manipulator 19 is a combination of sections or joints similar to the analog arm, except that it is constructed on a larger scale and driven differently as described herein. It may be joined to the exterior hull of the vehicle 20 by means such as welding, riveting, bolting or other joining means.

Transducer means 9 such as pressure and flow rate transducers are connected to the hydraulic lines leading to the manipulator element from hydraulic valve means 7 and convert the hydraulic fluid flow rate and/or pressure occurring in the line to a proportional electrical signal. Occurrence and magnitude of the signal is proportional to the direction and magnitude of the exterior arm motion responding to hydraulic valve opening and closing. The flow rate is a measure of element response providing the signal for generator 8. The same measure could also be made from the fluid pressure.

The difficulties of connecting a direct reading device to an element to indicate, for example, potential, are overcome. The effect of the corrosive undersea level are also minimized. The specific type of flow and/or pressure transducer is selected depending upon the particular arm embodiment. An example of a flow rate meter is the hi-mass rate flow meter. An example of a pressure transducer is a resistance fluid strain gauge.

Conversion means 12 (see FIG. 2) may include a low pass filter for amplifying the transducer signal and for filtering its noise content. Various electrical devices, mechanical, and piezo electric elements may be used to provide low pass filtering. Also included within the conversion means is an integrator circuit means for converting the output of the hydraulic transducers (pressure and/or flow rate) to a measure of exterior manipulator element position. The integrator converts a given flow rate or pressure to provide a measure of the displacement or movement of the exterior manipulator element as a function of the amount of time the pressure and/or fluid existed It should be understood that the presence of non-linearities such as fluid friction, etc. may require a complex computation to produce an exact output signal that is proportional to exterior manipulator element position.

The output of the conversion means in the form of an electrical signal is connected through lead 21 to, and is used to balance the input of, the error signal generator 8 so that the input is zero. Under zero input conditions, the switching means 10 is not energized in either direction and the position of the exterior manipulator corresponds to the position of the arm depending on the accuracy of the sensing and conversion means.

For the embodiment shown, the output of the analog arm element represented by a change in signal from the position sensing potentiometer 4 is used as an input to the differentiator circuit 15. Circuit 15 provides an output signal proportional to a first derivative of the analog arm position. The output signal of circuit 15 drives the torque motor 14 which is mounted on the analog arm element joint. The torque motor provides rate damping to the analog arm element. Thus, when the arm is moved by an operator, a counter force is developed such that the rate of motion of the analog arm element is proportional to the force applied. The rate damping is adjusted so that for normal operating forces the analog arm motion and the external manipulator motion are substantially the same.

In operation, the underwater manipulator operator grips the terminal member of the analog arm and moves it to a position representing a selected position for the external manipulator. He observes the resulting motion of the manipulator of the analog arm. After an extended period of operation, a discrepancy between the motion of the analog arm element and the external arm elements may occur. If so, it can be corrected by re-centering the analog arm after the manipulator has achieved a reference position, such as by gripping a tool.

Although the invention has been described and illustrated in detail, it is to be understood that the same is by way of illustration and example only, and is not to be taken by way of limitation; the spirit and scope of this invention being limited only by the terms of the appended claims.

We claim:

1. An underwater manipulator system of the type including a positionable analog arm, a manipulator having a plurality of movable elements, and hydraulic actuator means responsive to movements of said analog arm for actuating said elements of said manipulator by hydraulic fluid flow, that improvement comprising: transducer means for determining the position of said manipulator, said transducer means comprising; means for measuring the characteristics of said fluid flow and conversion circuit means for converting said measured characteristics into a first electrical signal indicative of the position of said manipulator elements.

2. The system as recited in claim 1 wherein said means for measuring the characteristics comprises first means for measuring the flow rate of the fluid into said hydraulic actuator means and wherein said conversion circuit means comprises means for integrating the output of said first means.

3. The system as recited in claim 1 wherein said means for measuring the characteristics comprises means for measuring the pressure of the fluid into said hydraulic actuator means.

4. The system as recited in claim 1 wherein said means for measuring the characteristics comprises means for measuring the flow rate and the pressure of the fluid into said hydraulic actuator means.

5. The system defined in claim 4 further comprising:
means for producing a second electrical signal indicative of the position of said analog arm, and
means for comparing said first and second electrical signals and for generating an error signal indicative of the difference therebetween, whereby said error signal represents the difference in the position of said analog arm and said manipulator.

6. The system defined in claim 5 further comprising: hydraulic valve means for controlling the flow of fluid to said hydraulic actuator means in response to said error signal, whereby said manipulator is caused to move into positional correspondence with said analog arm.

7. The system as recited in claim 6 further comprising a structural wall adapted to carry a pressure load, said wall enclosing said positionable analog arm and said means for measuring the characteristics of said fluid flow.

8. The system defined in claim 5 further comprising means for providing rate damping to said positionable analog arm, said damping substantially corresponding to that damping experienced by said manipulator during motion in the viscous underwater medium, said means for providing comprising:
means for differentiating said second electrical signal, and
a torque motor mechanically connected to said analog arm, said torque motor responsive to said differentiated second electrical signal.

References Cited

UNITED STATES PATENTS

| | | | |
|---|---|---|---|
| 2,241,687 | 3/1966 | Orloff | 214—1 |
| 3,263,824 | 8/1966 | Jones et al. | 214—1 |

FOREIGN PATENTS 781,465  8/1957  Great Britain.

ROBERT G. SHERIDAN, *Primary Examiner.*